(12) United States Patent
De Coninck et al.

(10) Patent No.: US 11,708,302 B2
(45) Date of Patent: Jul. 25, 2023

(54) METHOD OF CONTINUOUS MANUFACTURING OF SOLIDIFIED STEELMAKING SLAG AND ASSOCIATED DEVICE

(71) Applicant: ArcelorMittal, Luxembourg (LU)

(72) Inventors: Eric De Coninck, Ghent (BE); Ivonne Infante, Ghent (BE); Rafael Mattos Dos Santos, Guelph (CA); Ghania Ounoughene, Leuvin (BE); Thomas Van Gerven, Leuvin (BE)

(73) Assignee: ArcelorMittal, Luxembourg (LU)

( * ) Notice: Subject to any disclaimer, the term of this patent is extended or adjusted under 35 U.S.C. 154(b) by 561 days.

(21) Appl. No.: 16/650,595

(22) PCT Filed: Sep. 28, 2017

(86) PCT No.: PCT/IB2017/055967
§ 371 (c)(1),
(2) Date: Mar. 25, 2020

(87) PCT Pub. No.: WO2019/064052
PCT Pub. Date: Apr. 4, 2019

(65) Prior Publication Data
US 2020/0231498 A1    Jul. 23, 2020

(51) Int. Cl.
*C04B 5/00* (2006.01)
*C21B 3/08* (2006.01)
*C22B 7/04* (2006.01)

(52) U.S. Cl.
CPC .............. *C04B 5/00* (2013.01); *C21B 3/08* (2013.01); *C22B 7/04* (2013.01);
(Continued)

(58) Field of Classification Search
None
See application file for complete search history.

(56) References Cited

U.S. PATENT DOCUMENTS

| 5,229,063 A | 7/1993 | Stomp et al. |
| 5,516,357 A | 5/1996 | Rey et al. |

(Continued)

FOREIGN PATENT DOCUMENTS

| CN | 1101785 A | 4/1995 |
| CN | 101269920 A | 9/2008 |

(Continued)

OTHER PUBLICATIONS

Handbook of iron and steel, II, Iron and steelmaking, 3rd Edition, vol. 2, p. 317, 496 edited by The Iron and Steel Institute of Japan, published by Maruzen Co., Ltd., see partial translation/explanation.
(Continued)

*Primary Examiner* — Scott R Kastler
(74) *Attorney, Agent, or Firm* — Davidson, Davidson & Kappel, LLC

(57) ABSTRACT

A method of continuous manufacturing of solidified steelmaking slag including the steps of solidifying molten steelmaking slag comprising at least 2% in weight of free lime so as to produce solidified slag particles having a diameter below 1 mm, the molten steelmaking slag being put in contact with at least a first carbonation gas during such solidification, cooling the solidified slag particles down to a temperature below or equal to 300° C., in a closed chamber, the solidified slag particles being put in contact with at least one second carbonation gas during such cooling. The invention is also related to an associated device.

23 Claims, 2 Drawing Sheets

(52) U.S. Cl.
CPC .. *C21B 2400/024* (2018.08); *C21B 2400/026* (2018.08); *C21B 2400/062* (2018.08)

(56) References Cited

U.S. PATENT DOCUMENTS

| | | | |
|---|---|---|---|
| 5,569,314 | A | 10/1996 | Mikhail |
| 8,845,989 | B2 | 9/2014 | Chung et al. |

FOREIGN PATENT DOCUMENTS

| | | | | |
|---|---|---|---|---|
| CN | 102476798 | A | | 5/2012 |
| CN | 104988264 | A | | 10/2015 |
| CN | 103596664 | B | | 1/2016 |
| EP | 2893046 | B1 | | 6/2016 |
| GB | 2528972 | A | | 2/2016 |
| JP | 2004238233 | A | * 8/2004 | ........... C04B 18/026 |
| JP | 2009227493 | A | | 10/2009 |
| JP | 5040257 | B2 | | 10/2012 |
| JP | 5040257 | B2 | | 10/2012 |
| JP | 5327184 | B2 | | 10/2013 |
| JP | 5327184 | B2 | | 10/2013 |
| JP | 2016094664 | A | | 5/2016 |
| KR | 20090036352 | A | | 4/2009 |
| KR | 20130046816 | A | | 5/2013 |
| RU | 2025469 | C1 | | 12/1994 |
| RU | 1803998 | A1 | | 1/1995 |
| RU | 2621090 | C2 | | 5/2017 |
| SU | 1761704 | A1 | | 9/1992 |
| UA | 119568 | C | | 7/2019 |
| WO | 2013094861 | A1 | | 6/2013 |
| WO | WO2014005227 | A1 | | 1/2014 |
| WO | 2016041092 | A1 | | 3/2016 |
| WO | WO2017049311 | A1 | | 3/2017 |

OTHER PUBLICATIONS

See International Search Report of PCT/IB2017/055967, dated Jun. 18, 2018.

"Stabilization of basic oxygen furnace slag by hot-stage carbonation treatment" from R.M.Santos & al. and published in Chemical Engineering Journal 203 (2012) pp. 239-250.

* cited by examiner

METHOD OF CONTINUOUS MANUFACTURING OF SOLIDIFIED STEELMAKING SLAG AND ASSOCIATED DEVICE

The invention is related to a method of continuous manufacturing of steelmaking slag and to an associated device.

BACKGROUND

In conventional steelmaking routes, pig iron is produced into a blast furnace and is then made into steel, for example in a converter. In the converter, oxygen is blown through molten pig iron, which lowers carbon content of pig iron and changes it into steel. Mineral additions such as lime and/or dolomite are added into the converter so as to remove impurities contained in pig iron such as silicium, phosphor, and manganese and reach the required steel composition. Those additions together with the impurities extracted from pig iron form converter slags.

The molten steel thus formed may then be subjected to a refining process in order to achieve steel composition requirements for high quality steel grades. Molten steel is poured in a ladle and alloying elements are added to the molten steel while impurities are removed, notably by injection of mineral additions, such as lime and/or dolomite. Ladle slag is a by-product of such a refining process.

Big steelmaking plants generate hundreds of thousands of steelmaking slag per year, which generates storing costs and necessity of available place. Those slags nevertheless have good mechanical properties, notably in terms of toughness and wear resistance, which make them particularly interesting for use in civil engineering or in road buildings. Road buildings include all roadworks requiring use of aggregates, notably the manufacturing of asphalt, subgrades, base course, subbase for road systems, or fills. However, the main issue with this material comes from its significant content of free lime which makes aggregates non-stable. The term steelmaking slag will be used in the rest of the text. It encompasses both ladle and converter slags previously described, but also any slag being a by-product of a steelmaking plant and having a free lime content upper than 2%.

Indeed, due to the addition of lime and/or dolomite, both converter and ladle slag have a high content in free lime (CaO), up to 25%. This free lime may on a short-term react with rain water to form calcium hydroxides according to hydration reaction (1):

$$CaO + H_2O \rightarrow Ca(OH)_2 \qquad (1)$$

and on a long-term react with carbon dioxide from air to form calcium carbonates according to the carbonation reaction (2):

$$CaO + CO_2 \rightarrow CaCO_3 \qquad (2)$$

Both calcium hydroxides and calcium carbonates having a higher volume than free lime, there is volume instability of those slags with a volume expansion up to 10%, which may cause damages to the roads where they are used. This prevents traditional recycling of the converter slags in road construction. Several solutions have then been suggested to reduce free lime content and stabilize steelmaking slags.

For example, JP-B2-5327184 describes a method of producing slag wherein steelmaking slag is kept in a molten state in a closed vessel and $CO_2$ is blown into the molten slag so that the blow-in amount of $CO_2$ is ≥0.07 ton per ton of slag. The aim is to stabilize the slag in the molten state by transforming the free lime into calcium carbonates according to reaction (2). The blowing process lasts between 10 and 60 minutes. The molten slag is then transferred to a solidification device where it is cooled to a temperature inferior to 860° C. so as to be solidified. This method allows reaching free lime content in the solidified slag inferior to 1.5%. However this process implies providing a dedicated chamber with injection means in addition to the cooling equipment, energy to keep the slag in a molten state while blowing and it implies a transfer of the stabilized molten slag towards the cooling device.

JP-B2-5040257 describes a method of treating steelmaking slag, wherein slag is charged into a rotation drum where it is crushed and cooled. Thus solidified slag is then put into contact with $CO_2$ for carbonation according to reaction (2). This process requires an additional step of carbonation, with dedicated equipment.

U.S. Pat. No. 5,569,314 describes a method of producing a thermally stable steelmaking slag suitable for use in applications requiring dimensional stability, e.g. as aggregate in road construction. In this method fine particles of steelmaking slag are firstly sprayed with water at a temperature in the range of about 100° C. to 400° C., in order free lime to react with water according to hydration reaction (1). Thereafter, the hydrated slag particles are carbonated in the presence of $CO_2$ at a temperature in the range of about 500° C. to 900° C., whereby substantially all remaining free lime in the slag particles is converted to calcium carbonate. This process requires water for hydration and additional energy to reheat the slag for the hot carbonation step.

Article entitled "Stabilization of basic oxygen furnace slag by hot-stage carbonation treatment" from R. M. Santos & al. and published in Chemical Engineering Journal 203 (2012) pages 239-250, describes a hot-stage carbonation process in which granulated slag is cooled and, during this cooling step, is put in contact with $CO_2$. This article studies the influence of temperature and slag particle size on $CO_2$ uptake into the granulated slag, and so on the final content of free lime in the cooled slag.

SUMMARY OF THE INVENTION

The aim of the invention is to provide a continuous method of manufacturing of solidified steelmaking slag which allows stabilization of steelmaking slag while overcoming above mentioned drawbacks. An additional aim of the invention is to obtain a solidified slag with low free lime content, preferentially lower than 1%, while keeping a short treatment time so as to increase the overall productivity of the method.

The method according to the invention allows notably limiting the consumption of water and energy as well as equipment investment.

To this end, the invention is related to a method of continuous manufacturing of solidified steelmaking slag comprising the steps of:
- solidifying molten steelmaking slag comprising at least 2% in weight of free lime so as to produce solidified slag particles having a diameter below 1 mm, the molten steelmaking slag being in contact with a first carbonation gas,
- cooling in a closed chamber the solidified slag particles to a temperature inferior or equal to 300° C., the solidified slag particles being in contact with at least one second carbonation gas.

BRIEF DESCRIPTION OF THE DRAWINGS

The invention will be better understood upon reading the description which follows, given with reference to the following appended figures.

DETAILED DESCRIPTION

Figure 1:
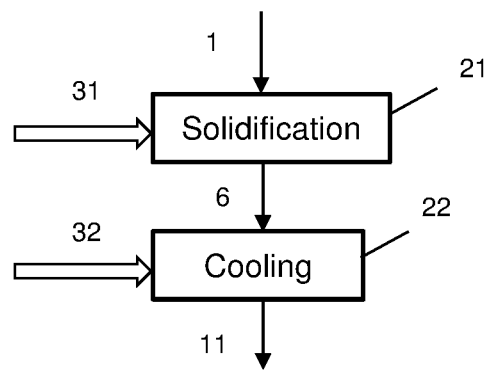
FIG. 1 illustrates a method according to the invention

In FIG. 1 is represented a continuous manufacturing method of solidified steelmaking slag according to the invention. Molten steelmaking slag 1 coming from the steel making step undergoes a solidification step 21, molten slag temperature depends on the composition of the slag but is generally comprised between 1300 and 1600° C. During this solidification step the slag is solidified in particles 6 and its temperature decreases up to 1000° C. The size of the slag particles 6 is inferior to 1 mm, preferentially inferior to 0.5 mm. The reason for this specific particles size will be explained later. During this solidification step, the molten slag is put in contact with a first carbonation gas 31. This first carbonation gas 31 comprises, for example, at least 20% in volume of $CO_2$, and preferentially more than 50% in volume. The remaining part of the first carbonation gas 31 may be composed of hydrogen, methane, carbon monoxide, nitrogen, oxygen or steam. This first carbonation gas 31 may be or may contain an exhaust gas from an iron making or a steelmaking plant, such as coke oven, blast furnace or converter gas which may have been firstly subjected to a cleaning step. This first carbonation gas 31 comprises for example at least 20% in volume of $CO_2$, between 5 and 30% in volume of CO, between 1 and 55% in volume of $H_2$, between 1 and 55% in volume of $N_2$, between 1 and 5% in volume of $O_2$. In another embodiment, the first carbonation gas 31 comprises also steam in addition to $CO_2$, the volume of steam in the gas being comprised between 20 and 70% in volume. The first carbonation gas 31 contains for example at least 20% in volume of $CO_2$, between 5 and 30% in volume of CO, between 1 and 55% in volume of $H_2$, between 1 and 55% in volume of $N_2$, between 1 and 5% in volume of $O_2$, the balance being steam. This injection of a first gas 31 allows first carbonation reaction between $CO_2$ and free lime contained in the slag according to the carbonation reaction (2). In a further embodiment there may be more than one first carbonation gas.

Slag particles 6 are then subjected to a cooling step 22 during which their temperature decreases up to 300° C. The cooling rate is preferentially comprised between 1° C./min and 100° C./min. It has to be upper than 1° C./min to keep a short treatment time but lower than 100° C./min to get a sufficient $CO_2$ uptake for the carbonation reaction. This cooling step is performed in a closed chamber wherein a second carbonation gas 32 is injected, this second carbonation gas 32 comprising, for example, at least 25% in volume of $CO_2$, and preferentially more than 50% in volume. The remaining part of the second carbonation gas may be composed of hydrogen, methane, carbon monoxide, nitrogen, oxygen or steam. This second carbonation gas 32 may be or may contain an exhaust gas from an iron making or a steelmaking plant, such as coke oven, blast furnace or converter gas which may have been firstly subjected to a cleaning step. This second carbonation gas 32 comprises for example at least 25% in volume of $CO_2$, between 5 and 30% in volume of CO, between 1 and 55% in volume of $H_2$, between 1 and 55% in volume of $N_2$, between 1 and 5% in volume of $O_2$. The temperature of this second carbonation gas 32 is chosen so as to achieve the required cooling rate; but it has preferentially a temperature comprised between 300 and 500° C. In another embodiment, the second carbonation gas 32 comprises also steam in addition to $CO_2$, the volume of steam in the gas being comprised between 20 and 70% in volume. This second carbonation gas 32 contains for example at least 25% in volume of $CO_2$, between 5 and 30% in volume of CO, between 1 and 55% in volume of $H_2$, between 1 and 55% in volume of $N_2$, between 1 and 5% in volume of $O_2$, the balance being steam. The size of the granulated slag particles inferior to 1 mm and preferentially inferior to 0.5 mm allows having a higher $CO_2$ uptake of the particles, which increases the kinetics of reaction between $CO_2$ and lime contained in the slag, according to carbonation reaction (2). In a further embodiment there may be more than one second carbonation gas.

After this cooling step, at least 60% and preferentially more than 75% of the free lime initially contained in molten slag has been transformed into carbonates, according to reaction (2). The production time, between the pouring of the molten slag and the recovery of cooled slag particles 11 is inferior to 30 minutes, preferentially inferior to 15 minutes.

The production method according to the invention is a continuous method, all the steps being performed one after the other without interruption. This allows having a short treatment time.

Figure 2:
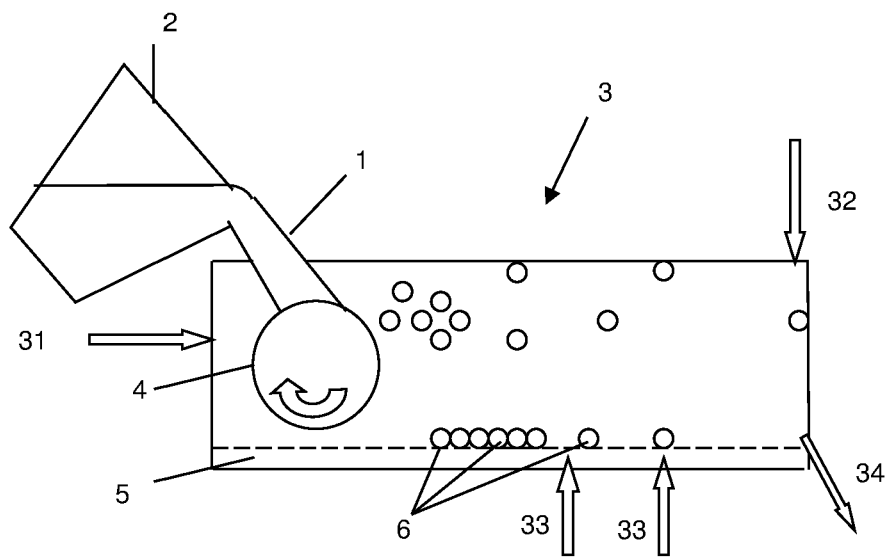
FIG. 2 illustrates a first example of an installation to implement a method according to the invention

FIG. 2 illustrates a first embodiment of an installation to perform a continuous manufacturing method according to the invention. In this installation, molten slag 1 from a steelmaking device 2 is poured into a closed chamber 3 on a granulation device 4 so as to form solidified particles of slag 6. This granulation device 4 may be for example a rotating wheel (as illustrated). In the configuration of FIG. 2 the rotating wheel 4 is a horizontal wheel, but in another embodiment, not illustrated, it may be a vertical wheel. At the same time and is the neighboring of the slag pouring, the first carbonation gas 31 is injected through first gas injection means (not illustrated) towards the molten slag. The characteristics of this first carbonation gas 31 are the same as the ones described for the first carbonation gas 31 used in the solidification step 21 of FIG. 1. The closed chamber 3 may be insulated. The solidified slag particles 6 thus formed stay in the closed chamber 3 where they are cooled according to the cooling step 22 previously described. The closed chamber 3 comprises injection means (not illustrated) designed to inject a second carbonation gas 32 towards the solidified slag particles 6. The characteristics of this second carbonation gas 32 are the same as the ones described for the second carbonation gas 32 used in the cooling step 22 of FIG. 1. The closed chamber is also equipped with collection means (not illustrated) to collect exhaust gas 34 from the inside of the closed chamber. These exhaust gas 34 may further be recycled by re-injection in the closed chamber as part of or as first 31 and/or second carbonation 32 gas.

Figure 3:
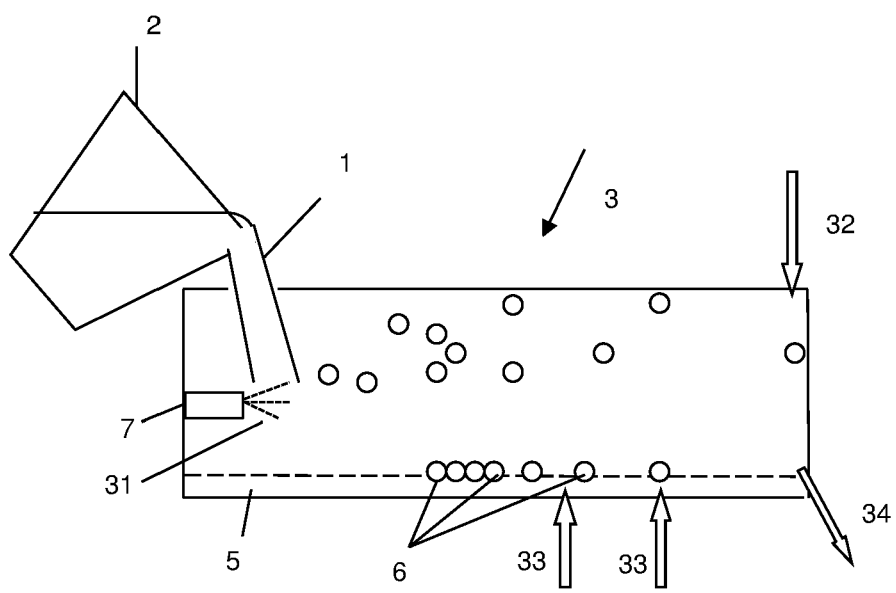
FIG. 3 illustrates a second example of an installation to implement a method according to the invention

FIG. 3 illustrates a second embodiment of an installation to perform a production method according to the invention. In this installation, molten slag 1 from a steelmaking equipment 2 is put into contact into a closed chamber 3 with a first carbonation gas 31 projected by an atomizer 7 so as to form solidified slag particles 6. The characteristics of this first carbonation gas 31 are the same as the ones described for the first carbonation gas 31 used in the solidification step 21 of FIG. 1. The atomizer 7 can be for example a SAT (Slag Atomizer Technology), developed by company Ecomaister-Hatch. The solidified slag particles 6 thus formed stay in the closed chamber 3 where they are cooled according to the cooling step 22 previously described. The closed chamber 3 comprises injection means (not illustrated) designed to inject a second carbonation gas 32 towards the solidified slag particles 6. The characteristics of this second carbonation gas 32 are the same as the ones described for the second carbonation gas 32 used in the cooling step 22 of FIG. 1. The closed chamber 3 is also equipped with collection means (not illustrated) to collect exhaust gas 34 from the inside of the closed chamber. These exhaust gas 34 may further be re-injected in the closed chamber as part of or as first 31 and/or second carbonation 32 gas.

In both embodiments the closed chamber 3 may further comprises means to keep the slag particles in motion during the cooling step. This allows to enhance contact between $CO_2$ and solidified slag particles 6 and so to improve $CO_2$ uptake by the solidified slag particles 6. For example, as illustrated in FIGS. 2 and 3, the bottom wall 5 of the closed chamber 3 may be porous and a third gas 33 may be injected through this porous wall 5, so as to create a fluidized bed. The flow rate of this third gas 33 has to be sufficient to keep the solidified slag particles 6 in motion. The third gas 33 may comprise at least 25% in volume of $CO_2$, remaining part being air and steam. Those means to keep the slag particles in motion may also be means to rotate the closed chamber 3, by using a rotating drum for example. This third gas may be or may contain an exhaust gas from an iron making or a steelmaking plant, such as coke oven, blast furnace or converter gas which may have been firstly subjected to a cleaning step or it may also be exhaust gas 34 collected from the closed chamber 3.

As illustrated in the embodiments, both solidification and cooling steps are performed in the same device and slag particles are treated in the same closed chamber which allows improving treatment time and yield.

What is claimed is:

1. A method of continuous manufacturing of solidified steelmaking slag comprising the steps of:
   solidifying molten steelmaking slag including at least 2% in weight of free lime so as to produce solidified slag particles having a diameter below 1 mm, the molten steelmaking slag being put in contact with at least a first carbonation gas during such solidification, the first carbonation gas includes at least 20% in volume of $CO_2$, between 5 and 30% in volume of CO, between 1 and 55% in volume of $H_2$, between 1 and 55% in volume of $N_2$ and between 1 and 5% in volume of $O_2$; and
   cooling the solidified slag particles down to a temperature below or equal to 300° C., in a closed chamber, the solidified slag particles being put in contact with at least one second carbonation gas during such cooling.

2. The method as recited in claim 1 wherein the first carbonation gas includes at least 50% in volume of $CO_2$.

3. The method as recited in claim 1 wherein the first carbonation gas includes steam.

4. The method as recited in claim 3 wherein the first carbonation gas includes at least 20% in volume of steam.

5. The method as recited in claim 1 wherein the second carbonation gas includes at least 25% in volume of $CO_2$.

6. The method as recited in claim 1 wherein the second carbonation gas is maintained at a temperature comprised between 300 and 500° C. during the cooling step.

7. The method as recited in claim 1 wherein the second carbonation gas includes steam.

8. The method as recited in claim 7 wherein the second carbonation gas includes at least 25% in volume of steam.

9. The method as recited in claim 1 wherein the cooling rate of solidified slag particles is between 1 and 100° C./min during the cooling step.

10. The method as recited in claim 1 wherein the solidified slag particles are kept in motion during the cooling step.

11. The method as recited in claim 10 wherein the solidified slag particles are kept in motion during the cooling step by injection of a third gas into the closed chamber.

12. The method as recited in claim 11 wherein the third gas includes at least 20% in volume of $CO_2$.

13. The method as recited in claim 1 further comprising exhausting at least a part of the gases inside the closed chamber and collecting the exhausted gases to be recycled as the first carbonation gas, the second carbonation gas or a third gas for keeping the solidified slag particles in motion.

14. The method as recited in claim 1 wherein the first carbonation gas, the second carbonation gas or at least a third gas for keeping the solidified slag particles in motion includes exhausts gases from ironmaking, steelmaking, sintering or coking plant.

15. The method as recited in claim 1 wherein the second carbonation gas includes at least 25% in volume of $CO_2$, between 5 and 30% in volume of CO, between 1 and 55% in volume of $H_2$, between 1 and 55% in volume of $N_2$, and between 1 and 5% in volume of $O_2$.

16. The method as recited in claim 1 wherein a stay time within the closed chamber is below 30 minutes.

17. The method as recited in claim 1 wherein at least 60% of free lime of the molten steelmaking slag is transformed into calcium carbonates.

18. The method as recited in claim 1, wherein said solidifying and cooling is performed in comprising:
    a closed chamber, the closed chamber including:
      a solidification device able to produce solidified slag particles having a diameter inferior or equal to 1 mm;
      a bottom porous wall; and
      gas injectors for injecting the at least first carbonation gas and the at least one second carbonation gas.

19. The method as recited in claim 18 further comprising an exhaust gas collector and a gas recirculator.

20. The method as recited in claim 18 wherein the solidification device is an atomizer.

21. The method as recited in claim 18 wherein the solidification device is a granulator.

22. The method as recited in claim 18 wherein at least one of the injectors is connected to an ironmaking, steelmaking, sintering or coking plant.

23. A method of continuous manufacturing of solidified steelmaking slag comprising the steps of:
    solidifying molten steelmaking slag including at least 2% in weight of free lime so as to produce solidified slag particles having a diameter below 1 mm, the molten steelmaking slag being put in contact with at least a first carbonation gas during such solidification; and
    cooling the solidified slag particles down to a temperature below or equal to 300° C., in a closed chamber, the solidified slag particles being put in contact with at least one second carbonation gas during such cooling, wherein the second carbonation gas includes at least 25% in volume of $CO_2$, between 5 and 30% in volume of CO, between 1 and 55% in volume of $H_2$, between 1 and 55% in volume of $N_2$, and between 1 and 5% in volume of $O_2$.

* * * * *